United States Patent

Maley et al.

[15] 3,660,678

[45] May 2, 1972

[54] BASIC TERNARY LOGIC CIRCUITS

[72] Inventors: Gerald A. Maley, Fishkill; James L. Walsh, Hyde Park, both of N.Y.

[73] Assignee: International Business Machines Corporation, Armonk, N.Y.

[22] Filed: Feb. 5, 1971

[21] Appl. No.: 112,898

[52] U.S. Cl. ............ 307/209, 307/214

[51] Int. Cl. ............ H03k 19/08, H03k 19/40

[58] Field of Search ............ 307/209, 214

[56] References Cited

UNITED STATES PATENTS 3,155,845 11/1964 Gruodis et al. ............ 307/209

3,467,909 9/1969 Avins et al. ............ 330/30 D

*Primary Examiner*—John Zazworsky

*Attorney*—Hanifin & Jancin and Martin G. Reiffin

[57] ABSTRACT

Basic ternary logic circuits provide all 27 single-variable ternary logic functions. Each of two current switches comprises a pair of transistors. Each transistor has an emitter connected to a respective one of a pair of current sources. The collector of one transistor of each current switch is connected to a load impedance and the collector of the other transistor is connected to a power supply. The input is at the base of one of the current switch transistors. The signal at the junction of the load impedance and the collectors is transmitted to the output by an emitter follower.

10 Claims, 9 Drawing Figures

| IN | 1 | 2 | 3 | 4 | 5 | 6 | 7 | 8 | 9 | 10 | 11 | 12 | 13 |
|---|---|---|---|---|---|---|---|---|---|---|---|---|---|
| 0 | 1 | 0 | 0 | 2 | 0 | 0 | 1 | 0 | 1 | 2 | 0 | 0 | 2 |
| 1 | 0 | 1 | 0 | 0 | 2 | 0 | 1 | 1 | 0 | 2 | 2 | 1 | 1 |
| 2 | 0 | 0 | 1 | 0 | 0 | 2 | 0 | 1 | 1 | 0 | 2 | 2 | 0 |
| | | | | | | | | | | | | D.C. | 1~ |
| 14 | 15 | 16 | 17 | 18 | 19 | 20 | 21 | 22 | 23 | 24 | 25 | 26 | 27 |
|---|---|---|---|---|---|---|---|---|---|---|---|---|---|
| 0 | 1 | 1 | 2 | 1 | 2 | 1 | 2 | 1 | 0 | 2 | 1 | 2 | 2 |
| 2 | 0 | 2 | 0 | 0 | 1 | 2 | 2 | 1 | 0 | 2 | 2 | 1 | 0 |
| 1 | 2 | 0 | 1 | 2 | 1 | 1 | 2 | 1 | 0 | 1 | 2 | 2 | 2 |
| 0~ | 2~ | → | ← | | | | D.C. | D.C. | D.C. | | | | |
FIG. 1
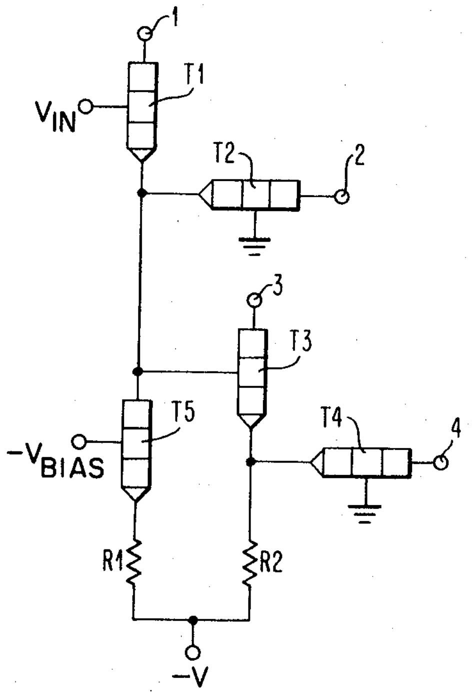
FIG. 2A
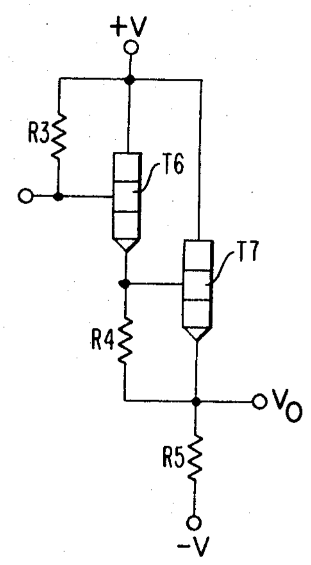
FIG. 2B
INVENTORS
GERALD A. MALEY
JAMES L. WALSH
BY Martin G. Reiffin
ATTORNEY

BASIC TERNARY LOGIC CIRCUITS

BACKGROUND OF THE INVENTION

1. Field of the Invention

The present invention relates to ternary algebra; that is, to an algebra wherein the variables may take on any one of three values, as distinguished from merely the two values of Boolean or binary algebra. In binary algebra, there are four functions of a single variable, whereas in ternary algebra there are 27 functions. Of these, four are trivial, three are required for logical completeness, and the remainder are valuable to an extent depending on the particular application.

2. Description of the Prior Art

Circuits for performing the ternary Interchanger 1 function are known in the prior art. The Interchanger 1 function provides an output of 1 when the input is 1, an output of 2 when the input is 0, and an output of 0 when the input is 2. However, the prior art provides no circuitry for performing most of the other 26 ternary logic functions of a single variable.

SUMMARY OF THE INVENTION

It is therefore a primary object of the present invention to provide circuitry for performing all 27 ternary logic functions of a single variable. This is achieved by a single circuit having four outputs which may be connected in various ways to provide the different functions.

BRIEF DESCRIPTION OF THE DRAWING

FIG. 1 is a table showing all 27 single-variable ternary functions;

FIGS. 2A and 2B are circuit diagrams of the unconnected components of a circuit in accordance with the present invention;

DESCRIPTION OF THE PREFERRED EMBODIMENTS

Referring now to FIG. 1 in more detail, there is shown a table listing all 27 of the single-variable ternary functions. Those functions designated 12, 21, 22, and 23 are trivial. Function No. 13 is the Interchanger 1 function designated by the symbol $\underset{\sim}{1}$. No. 14 is the Interchanger 0 function designated by the symbol $\underset{\sim}{0}$, and No. 15 is the Interchanger 2 function designated by the symbol $\underset{\sim}{2}$. Function No. 16 is the Clockwise Rotor function designated by the symbol $\rightarrow$ and No. 17 is the Counterclockwise Rotor function designated by the symbol $\leftarrow$ . All 27 single-variable functions may be produced by proper interconnection of the circuitry shown in FIGS. 2A and 2B.

Referring to the latter figure, there are shown a first current switch comprising transistors T1 and T2 and a second current switch comprising transistors T3 and T4. Transistor T5 constitutes a current source. The input signal $V_{in}$ is applied to the base of transistor T1 having its emitter connected to the emitter of transistor T2. The base of the latter is grounded. The emitters of transistors T1 and T2 are connected to the collector of transistor T5 and to the base of transistor T3. The emitters of transistors T3 and T4 are connected together and to the upper end of a resistor R2 constituting a current source and having its lower end connected to a potential source $-V$. Transistor T5 and resistor R1 constitute a second current source. The emitter of transistor T5 is connected to the upper end of resistor R1 having its lower end connected to the potential source $-V$. The base of transistor T5 is connected to a bias source $-V_{bias}$.

The above-described circuitry constitutes the logic portion of the circuit, whereas the portion shown in FIG. 2*b* is an emitter-follower arrangement. Transistor T6 and T7 have their collectors connected to the potential source $+V$. The emitter of transistor T6 is connected to the base of transistor T7 and also the upper end of the resistor R4 extending to the emitter of transistor T7 from where the output $V_o$ is taken. The latter node is at the upper end of a resistor R5 having its lower end connected to a potential source $-V$. Extending from the potential source $+V$ at the collector of transistor T6 is a resistor R3 having its lower end connected to the base of transistor T6. R3 is the load resistor for summing up the currents. The collectors of transistors T1, T2, T3 and T4 may be connected to a potential source or to the lower end of load resistor R3 in a manner to be described below, so as to provide the various ternary logic functions.

Figure 3:
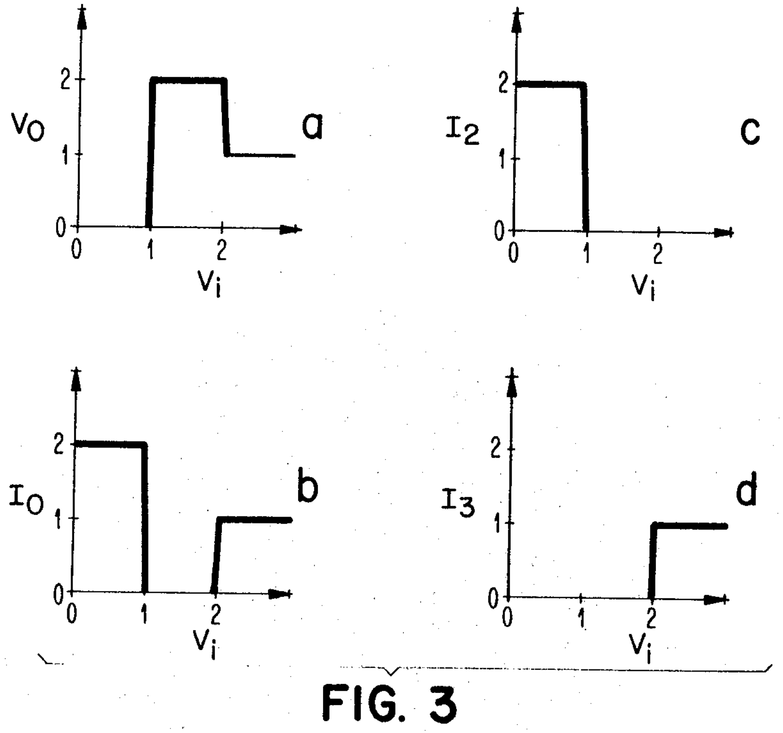
FIG. 3 shows the method of synthesizing an Interchanger 0 circuit.

Referring now to FIG. 3, there is shown the method of synthesizing the circuit to obtain the Interchanger 0 function. FIG. 3*a* shows the output potential plotted as a function of the input potential. It will be seen that when the input is 0 the output is 0, when the input is 1 the output is 2, and when the input is 2 the output is 1. FIG. 3*b* shows the current plotted as a function of the input potential. When the input potential is a minimum at 0, the current to the load resistor is a maximum at two units. When the input is at an intermediate level at 1, the load current is a minimum at 0. When the input is at a maximum level at 2, the load current is at an intermediate or 1 level. FIG. 3*c* shows one of the two component currents to be added to obtain the total current shown in FIG. 3*b*, and FIG. 3*d* shows the other component of the current to be added to synthesize the required output current.

Figure 4:
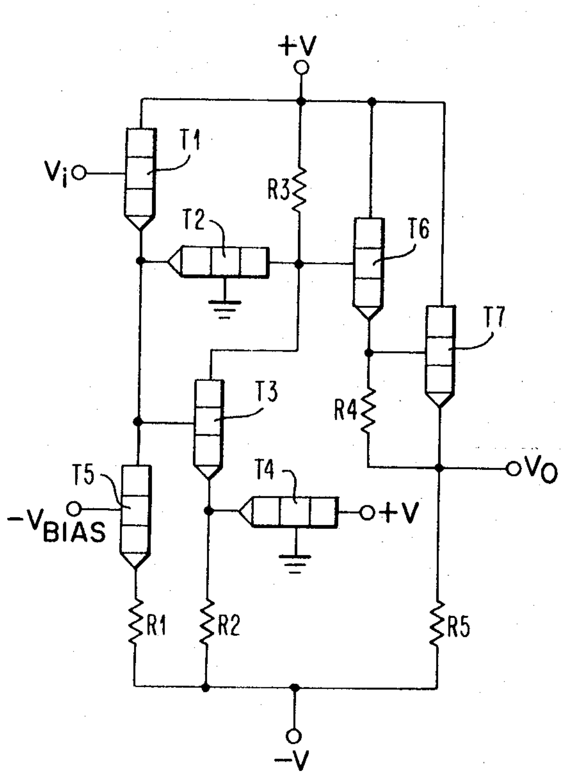
FIG. 4 shows an Interchanger 0 circuit in accordance with the present invention.

FIG. 4 shows the manner in which the subcircuits of FIGS. 2A and 2B are interconnected to provide the current and voltages of FIG. 3 so as to provide the Interchanger 0 function. The collectors of transistors T1, T6 and T7 and the upper end of load resistor R3 are connected to the source of positive potential $+V$. The collectors of transistors T2 and T3 are connected to the lower end of the load resistor R3. The collector of transistor T4 is also connected to the source of positive potential $+V$.

When the input potential $V_i$ at the base of transistor T1 is at 0 or its lowermost potential, transistors T1 and T3 are off and transistors T2 and T4 are on so that two units of load current flow through the load resistor R3, the transistors T2, T5 and the resistor R1, as shown for the current through R3 in FIG. 3*c*. Transistor T3 is cut off because its base potential is lowered by the emitter of transistor T1. Transistor T4 is conductive because its emitter potential is lowered by the emitter of transistor T3. Transistor T2 is conductive because its emitter potential is lowered by the emitter of transistor T1. When the input potential $V_i$ is at its uppermost of 2 level, only one unit of load current flows through load resistor R3 to obtain the results shown in FIG. 3*d*. Transistors T1 and T3 are conductive and transistors T2 and T3 are cut off. Transistor T3 is conductive because its base potential is raised by the emitter of transistor T1. Transistor T2 and T4 are cut off because their emitter potentials are raised by the respective emitters of transistors T1 and T3. When the input potential $V_i$ at the base of transistor T1 is at an intermediate or 1 level, then no current flows through the load resistor R3. Transistors T1 and T4 are conductive and transistors T2 and T3 are cut off. Transistor T2 is cut off because its emitter potential is raised by the emitter of transistor T1. Transistor T3 is cut off because its base potential is not raised high enough (for conduction) by the emitter of transistor T1. Transistor T4 is conductive because its emitter potential is lowered by the emitter of transistor T3. The resulting currents through load resistor R3 provide the output potentials shown in FIG. 3*a*.

Figures 5, 6:
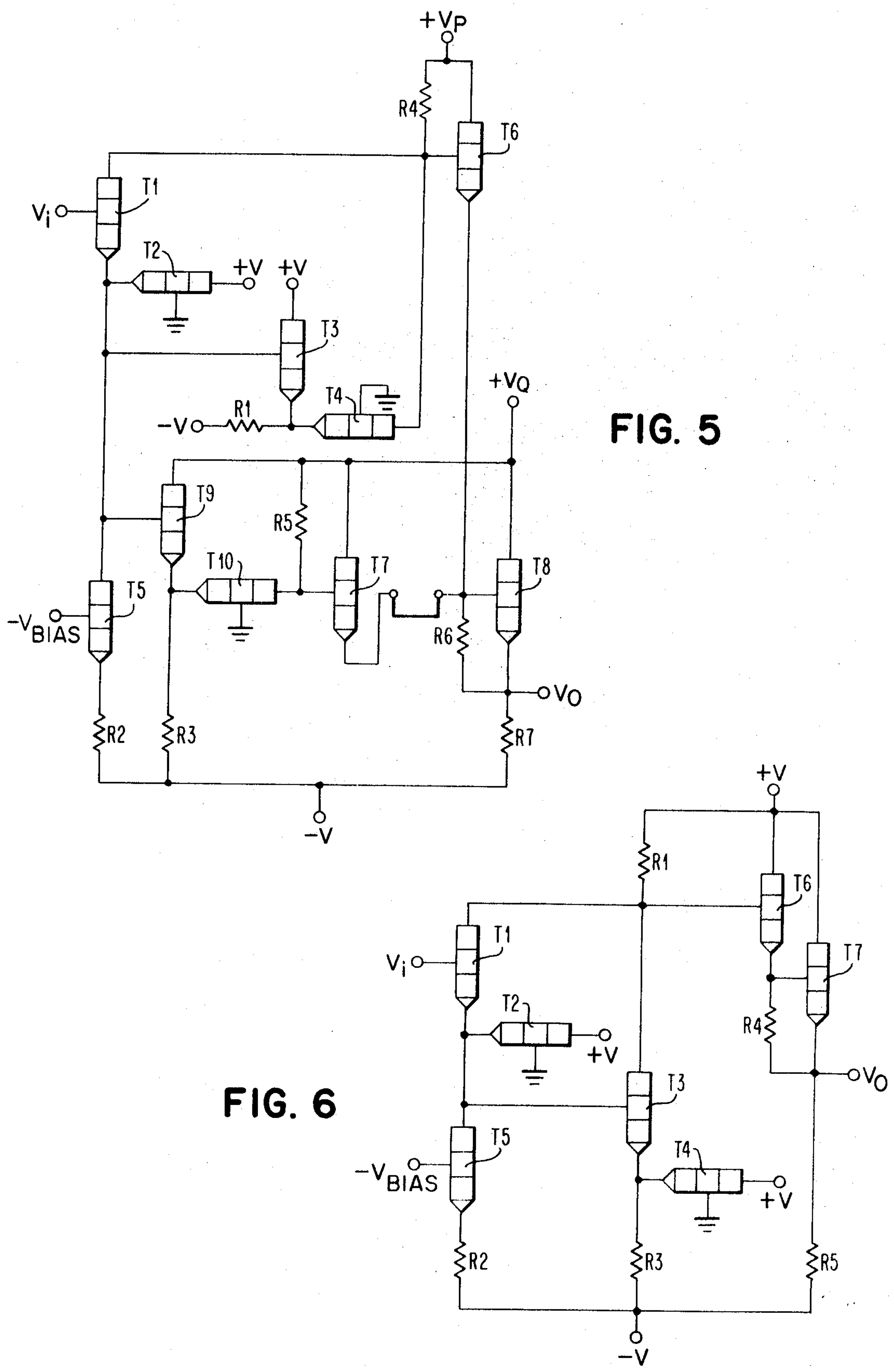
FIG. 5 shows a modified embodiment providing the Interchanger 2 function.
FIG. 6 is a circuit diagram of an Interchanger 1 circuit.

The interchanger 2 circuit is shown in FIG. 5. Transistor T5 and resistor R2 with power supplies $V_{bias}$ and $-V$ constitute a current source of one unit of current. Resistor R3 and potential source $-V$ constitute a current source of two units of current. Resistor R1 and potential source $-V$ constitute a current source of one unit of current. Transistor T8 and resistor R7 make up the output emitter follower. Transistors T6 and T7 constitute an emitter follower OR circuit. Resistor R6 provides a fast fall time at the base of transistor T8. The collector of transistor T6 is connected to the power supply $V_P$. The collectors of transistors T7, T8 and T9 are connected to the power supply $V_Q$.

The operation of FIG. 5 is as follows. If the input signal is at 0 level then transistors T1, T3, and T9 are off and transistors T2, T4 and T10 are conductive. Transistors T3 and T9 are cut off because their base potentials are lowered by the emitter of transistor T1. Transistors T2, T4 and T10 are conductive because their emitter potentials are lowered by the respective emitters of transistors T1, T3 and T9. A single unit of current flows through transistor T2 from positive potential source $+V$, to the current source T5 and R2. A single unit of current also flows through load resistor R4 to transistor T4 and resistor R1. This puts the base of transistor T6 where it corresponds to a 1 level. Because transistor T9 is off, transistor T10 will conduct two units of current through resistors R5 and R3. This places the signal level at the base of transistor T7 to where it corresponds to a 0 level. Because the base of transistor T6 is at a 1 level and the base of transistor T7 is at a 0 level, transistor T7 will be off and transistor T6 will conduct and provide the required output signal $V_o$ at a 1 level through the output emitter follower T8, R7.

If the input of transistor T1 is raised from 0 to 1, transistor T1 will conduct and transistor T2 will shut off. Transistors T3 and T9 remain cut off because their base potentials are not raised high enough (for conduction) by the emitter of transistor T1. Transistors T4 and T10 remain conductive because their emitter potentials remain lowered by the respective emitters of transistors T3 and T9. Transistor T4 will then conduct one unit of current. Two units of current now flow through resistor R4; one unit through transistor T1 and one unit through transistor T4. The base of transistor T6 will therefore correspond to a 0 signal level. Since transistor T9 is shut off, transistor T10 will conduct two units of current through resistor R5 to R3 and the base of transistor T7 will also correspond to 0. Transistors T6 and T7 are both at levels corresponding to 0. The level $V_o$ at the output of emitter follower T8, R7 is therefore 0.

If the input signal $V_i$ is raised from the 1 level to the 2 level, transistors T1, T3 and T9 conduct and transistors T2, T4 and T10 are off. Transistors T3 and T9 conduct because their base potentials are raised by the emitter of transistor T1. Transistors T2, T4 and T10 are cut off because their emitter potentials are raised by the respective emitters of transistors T1, T3 and T9. One unit of current flows through resistor R4 to transistor T1 and the base of transistor T6 is at a level corresponding to 1. Because transistor T9 is conducting, transistor T10 is off. Therefore, no current flows through resistor R5 and the base of transistor T7 is at a 2 level. With the base of transistor T6 at a 1 level and the base of transistor T7 at a 2 level, transistor T6 will be off and the output level from the emitter follower T8, R7 will be at the 2 level as required for a 2 level input.

Referring now to FIG. 6, there is shown an Interchanger 1 circuit wherein the collectors of transistors T2 and T4 are connected to the positive potential source $+V$ and the collectors of transistors T1 and T3 are connected to the lower end of the load resistor R1. The Interchanger 1 circuit provides an output of 1 when the input is 1, an output of 2 when the input is 0, and an output of 0 when the input is 2. Transistors T6 and T7 are resistors R4 and R5 constitute the output emitter follower arrangement. Transistor T5 and resistor R2, with power supplies $-V_{bias}$ and $-V$, constitute a current source of one unit of current. Resistor R3 and potential source $-V$ also constitute a current source of one unit of current. output The operation of the circuit of FIG. 6 is as follows. With the input potential $V_i$ at 0, transistors T1 and T3 are off and no current flows through the load resistor R1. Therefore, the output potential $V_o$ is at a 2 level. With the input level $V_i$ at a 1, transistors and T4 are on and transistors T2 and T3 are off. One unit of current flows through load resistor R1 to transistor T1 and the base of transistor T6 is at a level corresponding to 1. With the input $V_i$ at level 2, both transistors T1 and T3 are on and transistors T2 and T4 are off. Two units of current now flow through load resistor R1, one unit to transistor T1 and one unit to transistor T3. The base of transistor T6 will now be at a level corresponding to 0 and the output $V_o$ will be at the required 0 level.

Figures 7, 8:
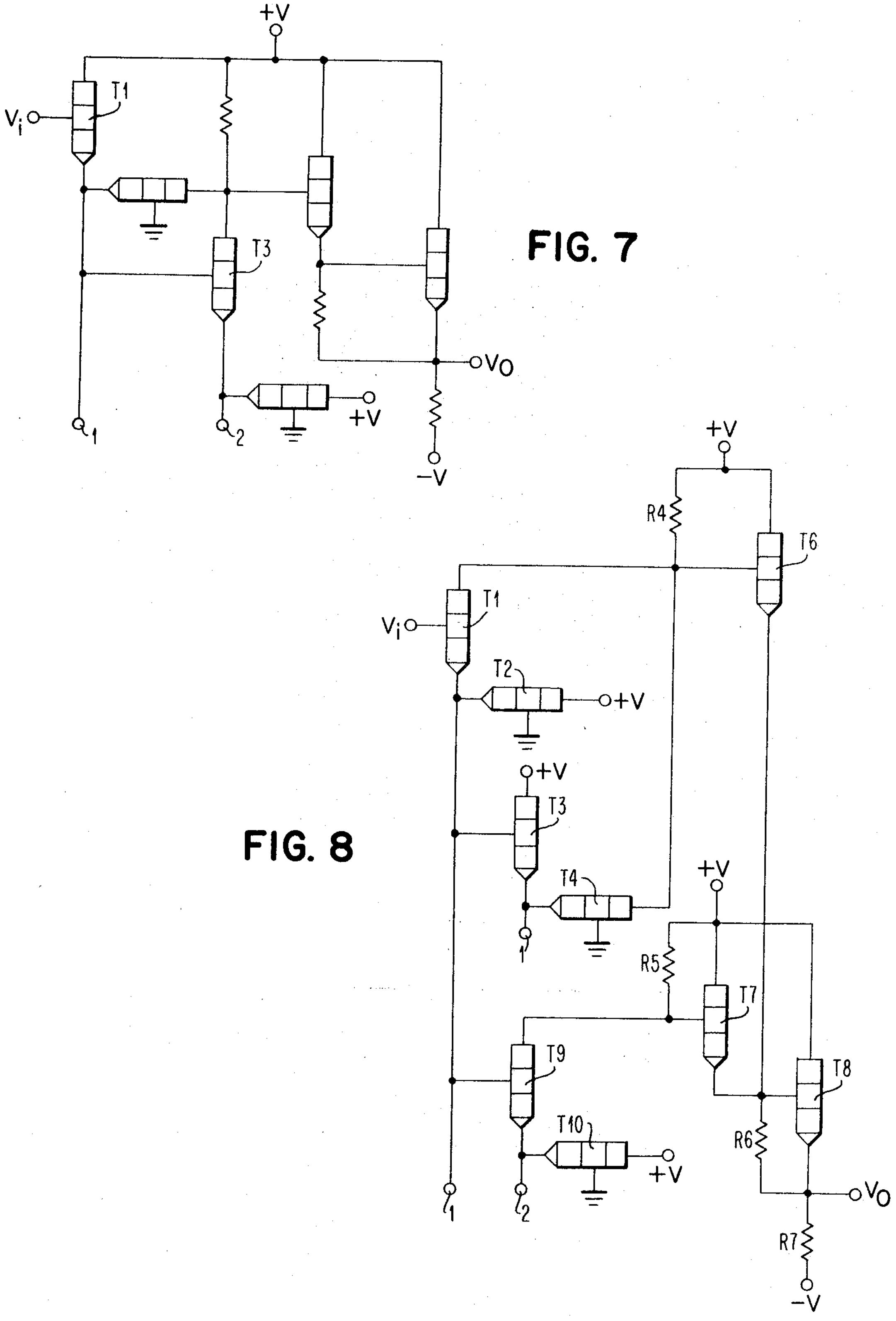
FIG. 7 is another embodiment for generating the Interchanger 0 function.
FIG. 8 shows another embodiment for generating the Clockwise Rotor function.

Referring now to FIG. 7, there is shown a circuit for generating the Clockwise Rotor function symbolized by ⌐ and which provides an output of 1 for an input of 0, an output of 2 for an input of 1, and an output of 0 for an input of 2. The Clockwise Rotor circuit is the same as the Interchanger 0 circuit of FIG. 4 except that the values of the current source are interchanged. That is, the current source connected to the emitter of transistor T3 provides two units of current whereas the current source connected to the emitter of transistor T1 provides only one unit of current. This is illustrated by the encircled numbers which symbolize current sources connected to the respective emitters of transistors T1 and T3.

Referring now to FIG. 8, there is shown a circuit for generating the Counterclockwise Rotor function symbolized by ⌐ and which provides an output of 2 for an input of 0, an output of 0 for an input of 1, and an output of 1 for an input of 2. This circuit may be derived from the Interchanger 2 circuit for FIG. 5 by interchanging the current sources and by connecting the lower end of resistor R5 to the collector of transistor T9 instead of transistor T10.

It is to be understood that the specific embodiments of the invention disclosed herein are merely illustrative of several of the many forms which the invention may take in practice and that numerous changes and modifications thereof will readily occur to one skilled in the art without departing from the scope of the invention as delineated in the appendent claims, and that the claims are to be construed as broadly as permitted by the prior art.

We claim:

1. A ternary logic circuit comprising
   an input node having applied thereto an input signal at any of three different voltage levels,
   current switch means for generating a ternary logic function of said input signal,
   an output node connected to said current switch means for transmitting said logic function,
   said current switch means comprising two current switches,
   a common load resistor, and
   means connecting said current switches to said common load resistor,
   each of said current switches comprising
   a pair of transistors each having an emitter,
   a pair of current sources, and
   means connecting the emitters of each pair of transistors to a respective one of said current sources.
2. A ternary logic circuit comprising
   an input node having applied thereto an input signal at any of three different voltages levels,
   current switch means for generating a ternary logic function of said input signal, and
   an output node connected to said current switch means for transmitting said logic function,
   said current switch means comprising
   two pairs of transistors each having a collector,
   a power supply,
   a load impedance, and
   means connecting one collector of each pair of transistors to said load impedance and connecting the other collector of each pair of transistors to said power supply.
3. A ternary logic circuit as recited in claim 2 wherein each of said transistors comprises
   an emitter,
   a pair of current sources, and means connecting the emitters of each pair of transistors to a respective one of said current sources.

4. A ternary logic circuit comprising
an input node adapted to have applied thereto an input signal at any of three different voltage levels,
means for generating a ternary logic function of said input signals, and
an output node connected to said generating means for transmitting said logic function,
said generating means comprising
a pair of transistors each having a collector,
a load impedance,
means connecting said collectors to said load impedance,
a second pair of transistors each having a collector,
a power supply, and
means connecting said last-recited collectors to said power supply.

5. A ternary logic circuit comprising
an input node adapted to have applied thereto an input signal at any of three different voltage levels,
means for generating a ternary logic function of said input signal,
an output node connected to said generating means for transmitting said logic function,
said generating means comprising
a pair of current sources,
a load impedance connected to said output node, and
a pair of current paths each extending from a respective one of said current sources to said load impedance.

6. A ternary logic circuit as recited in claim 5 and comprising
emitter follower means connected to said output node.

7. A ternary logic circuit as recited in claim 6 wherein each of said current paths comprises
a pair of transistors each having a collector and an emitter,
means connecting the emitters of each pair of transistors to a respective one of said current sources, and
means connecting the collector of one transistor of each pair of transistors to said load impedance.

8. A ternary logic circuit as recited in claim 7 and comprising
a power supply, and
means connecting the collector of the other transistor of each pair of transistors to said power supply.

9. A ternary logic circuit as recited in claim 5 wherein each of said current paths comprises
a pair of transistors each having a collector and an emitter,
means connecting the emitters of each pair of transistors to a respective one of said current sources, and
means connecting the collector of one transistor of each pair of transistors to said load impedance.

10. A ternary logic circuit as recited in claim 9 and comprising
a power supply, and
means connecting the collector of the other transistor of each pair of transistors to said power supply.

* * * * *

PO-1050
(5/69)

UNITED STATES PATENT OFFICE
CERTIFICATE OF CORRECTION

Patent No. 3,660,678 Dated May 2, 1972

Inventor(s) Gerald A. Maley, James L. Walsh -/-

It is certified that error appears in the above-identified patent and that said Letters Patent are hereby corrected as shown below:

Column 2, Line 5 (In the Specification Page 4, Line 7) change "Transistors" to -- Transistor --

Column 2, Line 8 (In the Specification Page 4, Line 10) after "also" insert --to--

Column 2, Line 45 (In the Specification Page 5, Line 22) before "off" insert --cut--

Column 2, Line 55 (In the Specification Page 5, Line 25) change "of" to--or--

Column 2, Line 60 (In the Specification Page 5, Line 27) change second "transistor" to --transistors--

PO-1050
(5/69)

UNITED STATES PATENT OFFICE
CERTIFICATE OF CORRECTION

Patent No. 3,660,678 Dated May 2,1972

Inventor(s) Gerald A. Maley, James L. Walsh - 2 -

It is certified that error appears in the above-identified patent and that said Letters Patent are hereby corrected as shown below:

| | |
|---|---|
| Column 3, Line 21 (In the Specification Line 19, Page 6) | after "T6" insert --to-- |
| Column 3, Line 69 (In the Specification Page 8, Line 1) | change "are" to --and-- |
| Column 3, Line 73 (In the Specification Page 8, Line 6) | delete "output" |
| Column 4, Line 2 (In the Specification Page 8, Line 11) | delete the second "a" |
| Column 4, Line 3 (In the Specification Page 8, Line 11) | before first "and" insert --T1-- |
| Column 4, Line 17 (In the Specification Page 8, Line 27) | change "source" to --sources-- |
| Column 4, Line 29 (In the Specification Page 9, Line 11) | change "for" to --of-- |

Signed and sealed this 8th day of May 1973.

(SEAL)
Attest:

EDWARD M.FLETCHER,JR.
Attesting Officer

ROBERT GOTTSCHALK
Commissioner of Patents